US008429089B2

(12) United States Patent
Juang

(10) Patent No.: US 8,429,089 B2
(45) Date of Patent: Apr. 23, 2013

(54) TECHNOLOGY VALUATION AND TRANSACTION SYSTEM AND RELATED METHOD CAPABLE OF CONDUCTING ON-LINE TECHNOLOGY VALUATION AND TRANSACTION

(75) Inventor: Shwei-Rong Juang, Taipei (TW)

(73) Assignees: Asia Pacific Technormart Corp., Taipei (TW); Shwei-Rong Juang, Taipei (TW)

( * ) Notice: Subject to any disclaimer, the term of this patent is extended or adjusted under 35 U.S.C. 154(b) by 1717 days.

(21) Appl. No.: 11/390,382

(22) Filed: Mar. 28, 2006

(65) Prior Publication Data

US 2006/0218120 A1    Sep. 28, 2006

(30) Foreign Application Priority Data

Mar. 28, 2005  (TW) ................................ 94109524 A

(51) Int. Cl.
*G06Q 10/00* (2012.01)
(52) U.S. Cl.
USPC ......................................................... 705/306
(58) Field of Classification Search .............. 705/1, 1.1, 705/7, 10, 347, 306
See application file for complete search history.

(56) References Cited

U.S. PATENT DOCUMENTS

| 6,556,992 | B1* | 4/2003 | Barney et al. .................... 1/1 |
| 2002/0002524 | A1* | 1/2002 | Kossovsky et al. ............. 705/36 |
| 2002/0116290 | A1* | 8/2002 | Hodges ........................... 705/26 |
| 2003/0088517 | A1* | 5/2003 | Medoff ............................ 705/59 |
| 2005/0071174 | A1* | 3/2005 | Leibowitz et al. ................ 705/1 |

OTHER PUBLICATIONS

Stewart, Jeffrey et al. Putting a price on biotechnology, Nature Publishing Group, http://www.nature.com/bioent/building/tech/012003/box/nbt0901-813_BX7.html, 2004.*
Brigham, Eugene F., Financial Management Theory and Practice, The Dryden Press, 1979.*
Reilly, Robert F. et al. Valuing Intangible Assets, McGraw-HIII Professional, 1999.*

* cited by examiner

Primary Examiner — Dennis Ruhl
(74) Attorney, Agent, or Firm — Bacon & Thomas, PLLC

(57) ABSTRACT

A technology valuation and transaction system and related method are proposed for connecting to at least one terminal device via a network unit. The method allows members to login to the system and provides related technology for conducting technology valuation and transaction online. The system at least includes a web server having installed therein a technology valuation and transaction interface for users to store technology related data and conduct technology valuation and transaction online, an expert database for storing related data of experts providing services of technology valuation in all fields, a technology supply database for allowing a supplier to store technology supply data, a technology demand database for a demander to store related data of a required technology, and at least one terminal device having installed therein a browser for allowing users to execute the technology valuation and transaction interface for technology valuation, matches and transaction.

29 Claims, 5 Drawing Sheets

TECHNOLOGY VALUATION AND TRANSACTION SYSTEM AND RELATED METHOD CAPABLE OF CONDUCTING ON-LINE TECHNOLOGY VALUATION AND TRANSACTION

FIELD OF THE INVENTION

The present invention relates to network transaction technologies, and more particularly, to a technology valuation and transaction system and method for conducting processes of technology valuation, matches and trades online remotely via a network unit.

BACKGROUND OF THE INVENTION

The $21^{st}$ century is an era of knowledge in which knowledge and creative ideas dominate the economy and in the economy of knowledge, trade is no longer limited to only tangible commodities. Specifically for high-tech enterprises, possessions of intangible assets such as knowledge and intellectual property rights including technology and patents that can bring even greater commercial profits have gradually exceeded the values of conventional tangible assets. In other words, besides profits gained from and based on tangible assets such as manpower, manufacturing factories and equipment, specific knowledge or intangible assets may even contribute greater profits to a company. As such, technology transaction and investments in such assets and even leveraged buyout of intangible assets become acceptable by enterprise managers and investors.

In transaction of intangible assets, economic behaviors such as production, transaction and consumption of intangible assets vary from assets of finished products in general that have tangible shapes and certain pricing basis for sales. On the contrary, intangible assets such as a specific technology or a patent, the core of transaction relies on the transfer of knowledge, wisdom and skills rather than calculating one by one the cost of each component item for a product. Therefore, it is difficult to set a pricing basis on such intangible assets which often requires specialists/experts of related fields to conduct technology valuation which are also difficult to find, thereby inadvertently limiting the transaction of intangible assets as a result.

Moreover, unlike general products, intangible assets do not have a fixed and stable market or sales channels, and especially lack an effective means to supply useful information on a regular basis which is crucial to enable technology demanders and suppliers of such assets to conduct transaction with one another accordingly. As such, in view of the potential value of patented technologies, the concept of technology commerce is being promoted globally to facilitate transaction of patented technologies to help upgrading the industry and enhancing competition capability as a result. However, the concept of technology commerce still lacks an effective mode of operation for implementation.

SUMMARY OF THE INVENTION

A primary objective of the present invention is to provide a technology valuation and transaction system and related method that allow a technology supplier to store related data of technology for valuation and transaction in a database system by using a network unit and a terminal device, thereby remotely conducting online technology valuation and transaction.

Another primary objective of the present invention is to provide a technology valuation and transaction system and related method that allow a technology demander to input information on the sought for technology in a database system by using a network unit and a terminal device, thereby allowing the database system and the technology supplier to conduct technology matching, comparison, and further inform both the technology supplier and the demander of the successful match for the complementary technology, thereby facilitating processes of the technology transaction.

According to the foregoing objectives, a technology valuation and transaction system and related method are proposed in the present invention. The valuation and transaction system can be connected to at least one terminal device via a network unit, allowing users to login to the system via the terminal device which provides related technologies that are required for conducting online technology valuation and transaction remotely. The system at least includes: (a) a network unit which refers to the internet; (b) an expert database for storing data relating to basic experts information, technology fields, and real merits, allowing a user to inquire information on related experts in all fields for providing technology valuation; (c) a technology supply database for storing data relating to basic technologies, keywords, technology valuation, cooperative conditions, payment terms, technology transaction and matching; (d) a technology demand database for storing data relating to demands of technology, keywords, types of rights, and countries of origin technology, allowing the system to match the complementary technology; (e) a member database for storing data relating to basic members, groups, and member groups, allowing a system administrator to assign to the users with different access rights to databases and limits of authorization for use of the system, and also generate different pictures according to a user's access right and limits of authorization; (f) a Web Server for installing a technology valuation and transaction interface therein, allowing a user to access to data stored in the technology supply database, the technology demand database, and the expert database via the technology valuation and transaction interface; (g) the valuation and transaction interface including a safety control module, a technology data input module, a data inquiring module, a technology-valuation module, a technology-matching module, a technology transaction module and a data transmitting module, allowing both the technology supplier and demander to input technology related data thereto so as to conduct technology valuation and transaction online remotely; and, (h) at least one terminal device having a browser for allowing a user to login to the valuation and transaction interface installed in the web server, such that the user can access to data stored in the technology supply database, the technology demand database, and the expert database.

The technology valuation and transaction method is applicable and can be connected to a web server having the technology valuation and transaction interface installed therein and using the technology valuation and transaction system which provides related technologies required for users to conduct technology valuation and transaction online remotely. The method includes: (1) installing a network unit connecting Internet, and installing a web server in the network unit, and at least one terminal device; (2) storing data relating to members, groups, and member groups in a member database; (3) storing data relating to basic information on experts, technology fields, and real merits of experts in an expert database; (4) installing the technology valuation and transaction interface in the web server and connected to the internet, and installing a browser in the terminal device; (5)

loginning the technology valuation and transaction interface via the terminal device when a technology supplier wishes to conduct a technology valuation and transaction, thereby storing related data in a technology supply database at the same time while a technology-valuation module appraises the value of said technology; (6) searching from a technology basic data file in the technology supply database and an expert fields data file in the expert database for an expert who has consistent technology and field qualifications when a technology supplier wishes to have recommendations for a suitable expert; (7) loginning the technology valuation and transaction interface via the terminal device when a technology demander wishes to conduct a technology valuation and transaction, and storing data related to the sought-after technology in a technology demand database; (8) executing the technology-matching module to search from the technology supply database and the technology demand database for the complementary data, and informing both the technology supplier and demander by E-mail of an initial match, and (9) executing a technology transaction module for both parties to conduct online negotiation and technology transaction.

In conclusion from the above, the system and method for technology valuation and transaction of the present invention provide a technology supplier to input data relating to technology for valuation or transaction in a technology supply database, allowing a technology demander to input data relating to the required technology in a technology demand database, and a technology-valuation module is executed to conduct technology valuation according to related data inputted by the technology supplier, and lastly, a technology-matching module is executed to search from the technology supply database and the technology demand data for the complementary data, and further inform both the technology supplier and demander by E-mail of an initial match, thereby facilitating the technology transaction online.

BRIEF DESCRIPTION OF DRAWINGS

The present invention can be more fully understood by reading the following detailed description of the preferred embodiments, with reference made to the accompanying drawings, wherein.

DETAILED DESCRIPTION OF PREFERRED EMBODIMENTS

Figure 1:
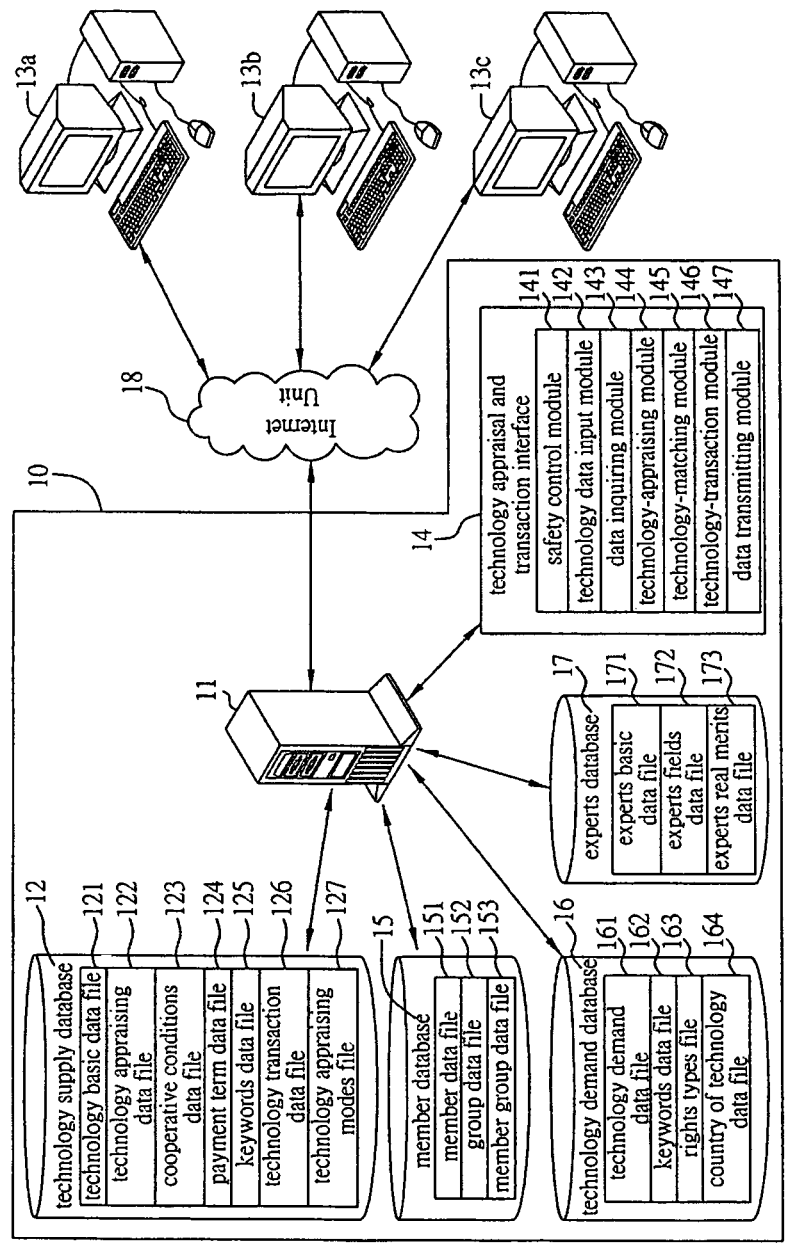
FIG. 1 is a block diagram illustrating a basic architecture of a technology valuation and transaction system of the present invention.

FIG. 1 is a block diagram illustrating a basic architecture of a technology valuation and transaction system 10 of a first embodiment according to the present invention. As shown in the drawing, the valuation and transaction system 10 comprises a web server 11, a technology supply database 12, a technology valuation and transaction interface 14, a member database 15, a technology demand database 16, and an expert database 17. In this embodiment, the valuation and transaction system 10 is provided for allowing users at terminal devices 13a, 13b and 13c (only 13a is exemplified in the following) to conduct online technology valuation and transaction via a network unit 18.

The web server 11 is used for installing the technology valuation and transaction interface 14 therein for allowing the terminal device 13a to conduct technology valuation and transaction online via the network unit 18, while the terminal device 13a is installed with a web browser (such as Microsoft Internet Explorer, Netscape Navigator, and so on), so that a user can login to the technology valuation and transaction interface 14 via the browser connected to the web server 11 to conduct technology valuation and transaction online remotely.

The technology supply database 12 is able to be installed in a computer system and is connected to the web server 11 via the intranet, or it can be installed directly in the web server 11. The technology supply database 12 comprises a technology basic data file 121, a technology valuation data file 122, a cooperative conditions data file 123, a payment term data file 124, a keywords data file 125, a technology transaction data file 126 and a technology valuation process file 127.

The technology basic data file 121 comprises technology serial numbers, technology names, technology fields, technology descriptions, types of rights, countries of original technology, obligees, scope of rights, and so on, for storing technology related data and the scope of rights thereof. The technology valuation data file 122 comprises technology serial numbers, cost of labor, time of involving, degrees of technology difficulty, basic quantity, standard ratios, utilization ratios, exploitation ratios, extension standard ratio, extension utilization ratio, exploit ratio of continuation, technology life cycles, extension technology lifespan, net cash flow discount ratio of technology reward during a lifespan, discount ratio of technology basic quantity, the number of period times, overall market potential, market share, expected net cash flow of business activity, business income, net ex-taxed business profit, net assets increasing variation capacity, the weighted averages capital costs, shareholders rights, the remaining sums in debt, rights capital costs, debt interest rates, business income tax rates, accounts face values, net profits after tax, fair market values, cost of replacement of intangible assets, practical depreciation, function deterioration, economic deterioration, profits of each period during investments, expected accomplished cost at an initial period of time, discount rates, periods of investments, net present values, market rewards, chances of approval for putting on market new medicines entering into a first clinical stage, each cost related expenses during the process of research and development, risk values of each procedure in the process of research and development, and technology prices, for storing technology related data that are necessary for conducting technology valuation and transaction. The cooperative conditions data file 123 includes technology serial numbers and modes of cooperation, for storing data relating to cooperative modes such as authorization of use, cooperative development, cooperative production, technology shareholding, and so on. The payment terms data file 124 includes technology serial numbers and terms of payment for storing specific requirements of each of the obligees. The keywords data file 125 comprises technology serial numbers and keywords for storing keywords data relating to the contents of technologies. The technology transaction data file 126 comprises technology serial numbers, buyer price ceiling limits (such as research and development cost; public tender, negotiations, cost-plus of price ratio), buyer price floor limits (speculated price floor tolerable by a seller), seller price ceiling limits (such as research and development cost added by direct valuation cost), seller price floor limits (such as costs of chance, direct valuation cost), prices of buyers, prices of sellers, trade ending time, and soon, for storing data relating to prices proposed by both the buyer and the seller of the technology. The technology valuation mode file 127 comprises an Expert Mode process, an Income Approach process, a Cost of Replacement process, a Net Present Value (NPV) and a Risk-Adjusted Net Present Value (rNPV) process, for storing data relating to the names of different modes of technology valuation, the corresponding industry, and the calculating formula thereof, wherein each of the calculating formula for technology valuation is described as follows:

1. Expert Mode:

$$MV = \sum_{i=1}^{N} \frac{UFi}{(1+R)^i} + \sum_{j=N+j}^{M} \frac{UFj}{(1+r)^j}$$

MV=Market Value of Industrial technology

UFi=basic quantity X standard ratio X utilization ratio X exploitation ratio

UFj=basic quantity X extension standard ratio X extension utilization ratio
   X exploit ratio of continuation N=Technology lifespan M=extension technology lifespan R=net cash flow discount ratio of technology reward during a lifespan R=discount ratio of technology basic quantity I=the number of period times

J=N+1

Basic quantity-Overall market potential X market share

Standard Ratio=expected net cash flow of business activity divided by business income Utilization ratio=a technology owner chooses a utilization ratio according to the number of owned technology from 1 to 4 (the more relative technology owned, the bigger the chosen value).

Exploitation ratio=a technology owner chooses an exploit ratio according to the adjusted functions that are designed to comply with the market requirements and the marketing superiority from 1 to 4.

2. Income Approach:
   1. Net present value flow discount analysis—Rights and interests (DCF to equity)

$$\frac{NI_1 - \Delta BVA_1 + \Delta BVND_1}{(1+Re)} + \frac{NI_2 - \Delta BVA_2 + \Delta BVND_2}{(1+Re)^2} + \ldots$$

NI: Ex-taxed net profit
ΔBVA: Net assets increasing variation capacity
ΔBVND: Net debts increasing variation capacity
Re: Rights and Interests Capital Costs Net present value flow discount analysis—debts and rights and interests $$\frac{NOPAT_1 + \Delta BVA_1}{(1+WACC)} + \frac{NOPAT_2 + \Delta BVA_2}{(1+WACC)^2} + \ldots$$

NOPAT: Ex-taxed net profit
ΔBVA: Net assets increasing variation capacity $$WACC = \frac{E}{D+E}Re + \frac{D}{D+E}Rd \times (1-t)$$

E: Shareholders rights
D: Remaining sums in debt
Re: Rights capital costs
Rd: Debt interest rates
t: Business income tax rates 3. Abnormal Earnings:

$$BVE_0 + \frac{NI_1 - Rex \times BVE_0}{(1+Re)} + \frac{NI_2 - Re \times BVE_1}{(1+Re)^2} + \frac{NI_3Re - \times BVE_2}{(1+Re)^3} + \ldots$$

BE: Accounts face values
NI: Net profits after tax
Re: Rights capital costs

4. Abnormal After Tax Net Business Profit (NOPAT)

$NOPAT =$ $$BVA_0 + \frac{NOPAT_1 - WACC \times BVA_0}{(1+WACC)} + \frac{NOPAT_2 - WACC \times BVA_1}{(1+WACC)^2} + \ldots$$

NOPAT: After tax net business profit
BVA: Net assets increasing variation capacity $$WACC = \frac{E}{D+E}Re + \frac{D}{D+E}Rd \times (1-t)$$

E: Shareholders rights
D: Remaining sums in debt
Re: Rights capital costs
Rd: Debt interest rates
t: Business income tax rates 5. Cost of Replacement:
   FMV=CR-PD-FO-EO FMV: Fair market value
CR: Cost of replacement of intangible assets
PD: Practical depreciation
FO: Functional deterioration
EO: Economical deterioration 6. Net Present Value, NPV:

$$NPV = \sum_{j=i}^{N} \frac{CFj}{(1+r)^j} - K$$

CFj: Profits of each period during investments
K: Expected accomplished cost at an initial period of time
r: Discount rates
j: Periods of investments 7. Risk-Adjusted Net Present Value; rNPV:

$$rNPV = {}_{NPV}PR_0 - \sum_{i=0}^{n} {}_{NPV}C_i \frac{R_0}{R_i}$$

NPV: Net present value
P: Market rewards
$R_0$: Chances of approval for putting on market new medicines entering into a first clinical stage
$C_i$: Each cost related expenses during the process of research and development Ri: Risk values of each procedure in the process of research and development $$\frac{R_0}{R_i}:$$

Probability of occurring clinical expenses for making experiments

The member database 15 can be installed in a computer system and connected to the web server 11 via the intranet or installed in the web server 11, the member database 15 comprising a member data file 151, a group data file 152, and a member group data file 153, wherein the member data file 151 includes data relating to member serial numbers, member names, addresses, telephone numbers, ID numbers, E-mail addresses, Account numbers and secret codes/passwords; the group data file 152 includes group codes, names, limits of authorization and descriptions, for storing data relating to the database access right of each group and the detailed description thereof; the member group data file 153 includes member numbers and group codes for storing data relating to member groups in which each member is grouped.

The technology demand database 16 is able to be installed in a computer system and connected to the web server 11 via the intranet or installed in the web server 11, the technology demand database 16 comprising a technology demand data file 161, a keywords data file 162, a rights types file 163, and a country of technology data file 164; wherein the technology demand data file 161 is further consisted of serial numbers, names, fields, descriptions, and expected accomplished functions and objectives of the demanded technology, for storing data relating to descriptions of the required technology; the keywords data file 162 includes serial numbers and keywords of the demanded technology for storing data relating to keywords of the required technology; the rights types file 163 includes serial numbers and types of rights of the demanded technology for storing data of rights types such as patents, commercial confidentiality and secrets; and, the country of technology data file 164 includes serial numbers and countries of the demanded technology, for storing data of each country in which the required technology is entitled to the right.

The expert database 17 can be installed in a computer system and connected to the web server 11 via the intranet or installed in the web server 11, the expert database 17 comprising an expert basic data file 171, an expert fields data file 172, and an expert real merits data file 173; wherein the expert basic data file 171 includes expert serial numbers, names, introductions/profiles, for storing basic data relating to each expert for technology valuation; the expert fields data file 172 includes expert serial numbers and technology fields, for storing data relating to technology fields of experts; and, the expert real merits data file 173 includes expert serial numbers and real merits, for storing data relating to successful cases of technology valuation conducted by each expert.

The technology valuation and transaction interface 14 (such as software) can be installed in a computer system and executed by the web server 11 or, the valuation and transaction interface 14 comprising a safety control module 141, a technology data input module 142, a data inquiring module 143, a technology-valuation module 144, a technology-matching module 145, a technology-transaction module 146, and a data transmitting module 147. The safety control module 141 is a safety control mechanism for controlling the access to the technology supply database 12, the technology demand database 16, and the expert database 17 for executing the valuation and transaction interface 14. A system administrator is required to add data of the account number of each member in the member data file 151 of the member database 15, for allowing each member to login to the system. The system administrator is required to designate the database access right and limits of authorization for executing the system functions for each group in the group data file 152, and further designate the group for each member in the member group data file 153, such that each member is designated with different database access right and limits of authorization for executing the system functions according to the designated group.

The technology data input module 142 is provided to allow the users, the technology supplier and demander, to input related information on technology valuation or transaction and store the inputted data into the technology supply database 12 and the technology demand database 16, which serve as the bases for conducting technology valuation, matching, or transaction accordingly.

The data inquiring module 143 cooperated with the safety control module 141 is used to allow users to inquire information stored in the technology supply database 12, the technology demand database 16, and the expert database 17, thereby providing related information on the supply and demand of technology and data of experts in all fields for conducting technology valuation.

The technology-valuation module 144 classifies and divides technology valuation areas into a primary technology valuation for general public use and an advance technology valuation for members' use. The primary technology valuation provides the user with related information on costs of manpower, time of involving and degrees of technology difficulty so as to conduct technology valuation online, wherein the degree of technology difficulty is indicated and shown by parameters 1 to 5, and costs of manpower is multiplied by the time of involving and the parameter indicating the degree of technology difficulty in order to obtain the price of technology accordingly; and further stores the price of technology into the technology valuation mode file 127 of the technology supply database 12. The advanced technology valuation first instructs a member to input the type of an industry, and then searches from the technology valuation modes file 127 of the technology supply database 12 for a corresponding and appropriate mode for technology valuation. For instance, the corresponding technology valuation mode for a biotech industry is a risk-adjusted net present value (rNPV), next, the user is required to input all information that are necessary for technology valuation so as to generate the price of technology according to the technology valuation formula, and further stores the price of technology into the technology valuation modes file 127 of the technology supply database 12. Moreover, the technology-valuation module 144 can also compare and match data inputted by the user on all technology fields of the required technology in the expert database so as to recommend suitable technology valuation experts.

The technology-matching module 145 compares and matches the data based on the conditions of inputted keywords, technology fields, types of rights and country of technology to search respectively from the technology supply database and the technology demand database for a corresponding data with inputted keywords, technology fields, types of rights and country of technology, and if identical data have been found to the foregoing in the technology supply database and the technology demand database, the matching module 145 informs both the technology supplier and demander of the successful match of technology.

After the technology-matching module 145 found an appropriate match for a technology that has an identical technology field and keywords, and also both the technology supplier and demander have shown their explicit interest in transaction the technology, the technology transaction module 146 is then executed to calculate data of the buyer's top and price floors, and the seller's top and price floors. After that, a price difference between the buyer's price ceiling and the seller's price floor is calculated and provided for both parties to negotiate online, and if both parties reached an agreement on a negotiated price, the technology transaction is accomplished.

The data transmitting module 147 sends the result of an initial match to both the technology supplier and demander by E-mail via the network unit 16 according to the member codes and E-mail addresses stored in the member data file 151 of the member database 15, and further requests both parties to login to the system for further confirmation of the technology in demand.

Figure 2:
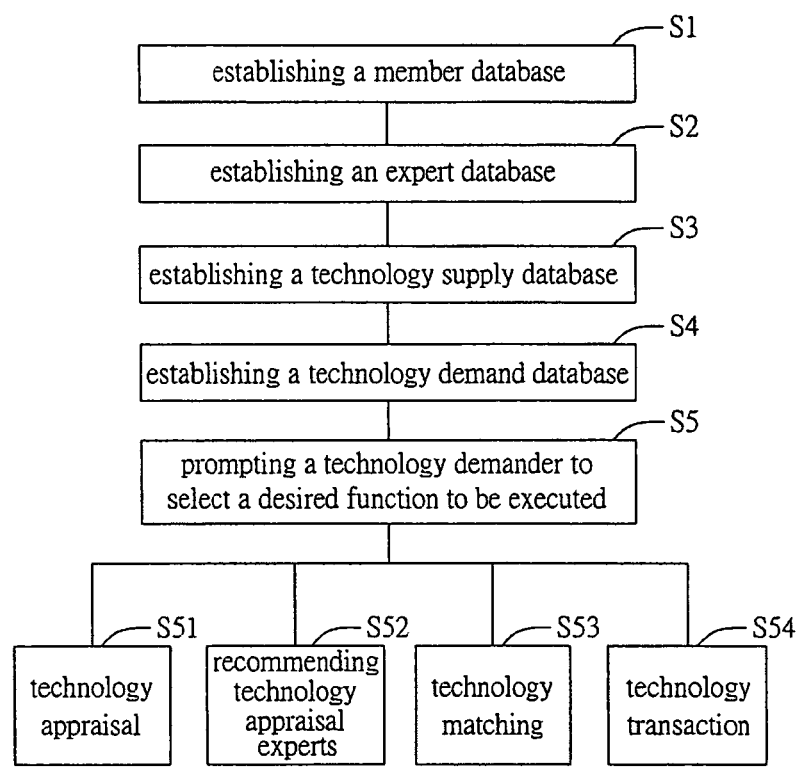
FIG. 2 is a flow chart illustrating steps of a technology valuation and transaction method of the present invention.

FIG. 2 is a flow chart illustrating each procedural step necessary for proceeding the method for technology valuation and transaction of the present invention. As shown in the drawing, first, step S1 is executed to establish the member database 15 for setting each member's access right to technology supply database 12, technology demand database 16, and expert database 17, as well as member's limits of authorization for use of system functions. Detailed flow chart for establishing the member database 15 is disclosed in FIG. 3. Next, step S2 is entered.

In step S2, the expert database 17 is established to store data of serial numbers, fields, names, introductions/profiles, technology backgrounds and real merits of experts that describe in detail related experiences and the technology field of each valuation expert. Then, step S3 is entered.

In step S3, the user, a technology supplier, is instructed to input data related to technology for valuation or transaction into the technology supply database 12 for conducting technology valuation, matches, and transaction online. Detailed flow chart for establishing the technology supply database 12 is disclosed in FIG. 4. Thereafter, step S4 is followed.

In step S4, the user, a technology demander, is instructed to input data of descriptions of technology in demand into the technology demand database 16 for conducting technology matching and transaction online. Detailed flowchart for establishing the technology demand database 16 is disclosed in FIG. 5. Thereafter, step S5 is followed.

In step S50, the technology demander proceeds to select an execution function via the technology data input module 142. Step S51 is entered if the function of online technology valuation is selected; whereas step S52 is entered if the function of recommending an valuation expert is selected; and, step S53 is entered if the function of technology matching is selected; step S54 is entered if the function of technology transaction is selected.

In step S51, the safety control module 141 is actuated to judge and identify if the user is a member, and if yes, the user is allowed to enter the advanced technology valuation, and is further prompted to input industry category thereto, then, the technology-valuation module 144 proceeds to search from the technology valuation modes file 127 of the technology supply database 12 for a corresponding mode for technology valuation according to the industry type inputted by the user, for example, the corresponding mode for valuation technology of a biotech industry is Risk-Adjusted Net Present Value (rNPV); next, the user is instructed to input all necessary data for executing the technology valuation mode, thereby generating a price for technology according to the technology valuation formula and storing the price of technology into the technology valuation modes file 127 of the technology supply database 12; on the other hand, for a non-member the user is only allowed to enter the primary technology valuation, and is instructed to provide related information on costs of manpower, time of involving, and degrees of technology difficulty for valuation the technology in demand, so as to execute the technology-valuation module 144 for proceeding online technology valuation, wherein the degree of technology difficulty is indicated and shown by parameters 1 to 5, and the cost of manpower is multiplied by the time of involving and by the parameter indicating the degree of difficulty to obtain the price of technology, and further the price of technology is stored into the technology valuation modes file 127 of the technology supply database 12.

In step S52, according to the field of technology obtained from the basic technology data file 121 of the technology supply database 12, a corresponding expert having an identical technology field is searched from the expert fields data file 172 of the expert database 17, and the procedure is ended if a corresponding expert is not found; whereas if an expert having an identical field is found, the data transmitting module 147 is executed to read the user's E-mail address from the member basic data file 151 of the member database 15, thereby transmitting basic data of the expert to the E-mail system via the network unit 16.

In step S53, the technology-matching module 145 is actuated to respectively read the basic technology database 121, keywords data file 125 contained in technology supply database 12, and technology demand data file 161, keywords data file 162, rights types file 163, and country of technology data file 164 contained in technology demand database 16, so as to search identical data that correspond to the technology field, keywords, type of rights and country of technology; if identical data is not found, the matching procedure is ended; whereas if identical data corresponding to the technology field, keywords, type of rights and country of technology are found, the data transmitting module 147 is executed to read E-mail addresses of the technology supplier and demander in the member data file 151 of the member database 15, so as to transmit message of an initial match to both parties via the network unit 16.

In step S54, the technology transaction module 146 is actuated to calculate the buyer and seller's top and price floors, and respectively store the price data in a seller price data column and a buyer price data column in the technology transaction data file 126 of the technology supply database 12, thereby providing both parties with references of the price difference between the buyer's price ceiling and the seller's price floor for price negotiation online accordingly; the technology data input module 142 stores respectively the selling price proposed by the technology supplier and the buying price by the demander in a selling price data column and a buying price data column in the technology transaction data file 126 of the technology supply database 12; the technology supplier stores the trade-ending time in a trade-ending time column in the technology transaction data file 126; and further the technology transaction module 146 is executed to compare the proposed prices by the technology supplier and demander. The procedure of technology transaction is complete if the proposed prices of both sides are consistent, whereas the transaction procedure is ended if the proposed prices remain inconsistent until the trade-ending time.

Figure 3:
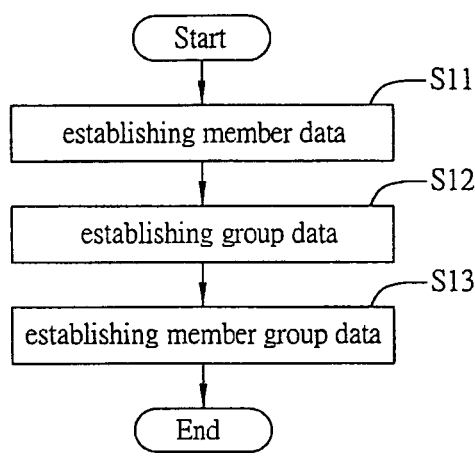
FIG. 3 is a flow diagram illustrating in detail steps involved in establishing a member database in the technology valuation and transaction method of the present invention.

FIG. 3 is a flow diagram illustrating in detail the steps involved in establishing a member database in the method for technology valuation and transaction of the present invention. As shown in the drawing, a first step S11 is executed to establish the member data file 151 to allow a system administrator to input data of members including serial numbers, names, addresses, telephone numbers, ID numbers, E-mail addresses, account numbers and passwords in the member data file 151, such that a member can login to the system by inputting the account number and password of the member data file 151. Thereafter, step S12 is executed.

In step S12, the group data file 152 is established to allow the system administrator to input data of groups including group codes, names, access rights to databases and descriptions for limitation in each database access right in the group data file 152, so as to set and designate the access right of each group to the technology supply database 12 and limits of authorization for executing the system functions.

In step S13, the member group data file 153 is established to allow the system administrator to input data of member groups including serial numbers and group codes of each member in the member group data file 153, so as to set and designate the access right of each member to the technology supply database 12 and limits of authorization for executing the system functions.

Figure 4:
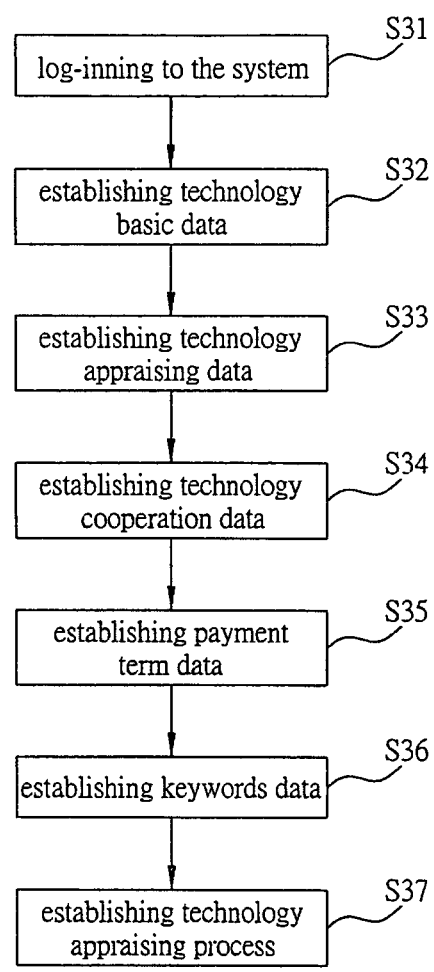
FIG. 4 is a flow diagram illustrating in detail steps involved in establishing a technology supply database in the technology valuation and transaction method of the present invention.

FIG. 4 is a flow diagram illustrating in detail the steps involved in establishing a technology supply database in the method for technology valuation and transaction of the present invention. As shown, a first step S31 is executed so that a technology supplier may login to the technology valuation and transaction system 10 via the terminal device 13*a*. First, the safety control module 141 reads the member group data file 153 in the member data file 151 to verify a user's identity, and automatically reads the member group data file 153 to further verify the user's access right to databases and limits of authorization for executing the system functions, and further displays a personal web page according to the authorization of usage. Thereafter, S32 is executed.

In step S32, the technology basic data file 121 is established so that a technology supplier can input thereto related data of technology for valuation and transaction that include serial numbers, names, fields, descriptions, types of rights, country of technology, obligees, and scope of rights, and soon, thereby allowing a technology demander to inquire technology related data for matching technology accordingly. Thereafter, step S33 is proceeded.

In step S33, the technology valuation data file 122 is established so that a technology supplier can input thereto related data of technology for valuation and transaction that include technology serial numbers, costs of labor, time of involving, degrees of technology difficulty, basic quantitys, standard ratios, utilization ratios, exploitation ratios, extension standard ratio, extension utilization ratio, exploit ratio of continuation, technology life cycles, extension technology lifespan, net cash flow discount ratio of technology reward during a lifespan, discount ratio of technology basic quantity, the number of period times, overall market potential, market shares, expected net cash flow of business activity, business income, net business profit after tax, net assets increasing variation capacity, the weighted averages capital costs, shareholders rights, the remaining sums in debt, rights capital costs, debt interest rates, business income tax rates, accounts face values, net profits after tax, fair market values, cost of replacement of intangible assets, practical depreciation, function deterioration, economic deterioration, profits of each period during investments, expected accomplished cost at an initial period of time, discount rates, periods of investments, net present values, market rewards, chances of approval for putting on market new medicines entering into a first clinical stage, each cost related expenses during the process of research and development, risk values of each procedure in the process of research and development, and technology prices, etc., thereby allowing the technology-valuation module 144 to conduct technology valuation accordingly. Thereafter, step S34 is proceeded.

In step S34, the cooperative condition data file 123 is established so that a technology supplier can input thereto terms of cooperation such as cooperative modes, authorization for use of technology, cooperative development, cooperative production, and technology shareholding, and so on, thereby allowing a technology demander to be aware of modes of cooperation that can be proceeded. Thereafter, step S35 is proceeded.

In step S35, the payment terms data file 124 is established so that a technology supplier can input thereto terms of payments such as conditions to pay royalties when reaching a pre-determined quantity of production, thereby allowing a technology demander to be aware of terms of payment for technology to be traded. Thereafter, step S36 is proceeded.

In step S36, the keyword data file 125 is established so that a technology supplier can input thereto keywords related to the contents of a required technology, thereby allowing the technology-matching module 145 to compare and match keywords of the required technology. Thereafter, step S37 is proceeded.

In step S37, The technology valuation mode file 127 is established so that the system administrator can input thereto data relating to modes of technology valuation that include Expert Mode, Income Approach, Cost of Replacement, Net Present Value, NPV and Risk-Adjusted Net Present Value rNPV, etc, thereby allowing the technology-valuation module 144 to conduct online technology valuation accordingly.

Figure 5:
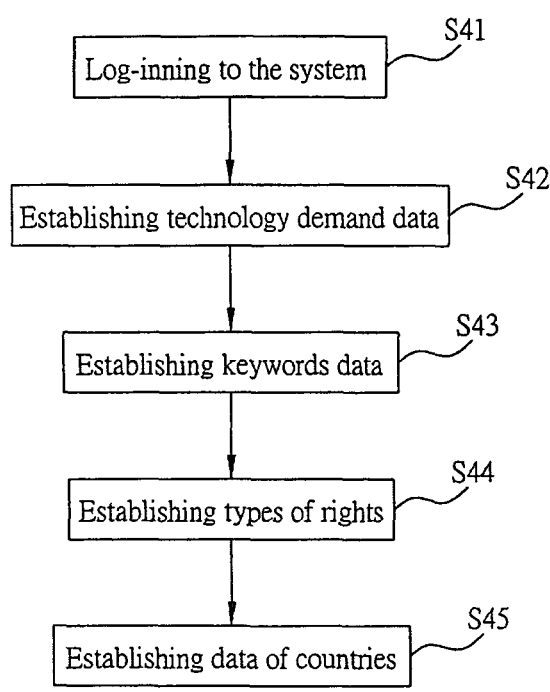
FIG. 5 is a flow diagram illustrating in detail steps involved in establishing a technology demand database in the technology valuation and transaction method of the present invention.

FIG. 5 is a flow diagram illustrating in detail the steps involved in establishing a technology demand database in the method for technology valuation and transaction of the present invention. As shown, a first step S41 is executed so that a technology demander may login to the technology valuation and transaction system 10 via the terminal device 13*a*. First, the safety control module 141 reads the member group data file 153 in the member data file 151 to verify a user's identity, and automatically reads the member group data file 153 to confirm the user's access right to databases and limits of authorization for executing the system functions, and further displays a personal web page according to the authorization of usage. Thereafter, S42 is executed.

In step S42, the technology demand data file 161 is established so that a technology demander can input thereto related data of the required technology that include serial numbers, names, fields, descriptions and the functions/objectives to be achieved for matching technology accordingly. Thereafter, step S43 is proceeded.

In step S43, the keyword data file 162 is established so that a technology demander can input thereto keywords relating to the contents of a required technology, allowing the technology-matching module 145 to compare and match keywords accordingly. Thereafter, step S44 is proceeded.

In step S44, the rights types file 163 is established so that a technology demander can store therein types of rights such as patents or commercial confidentiality and secrets, keywords, and so on, thereby allowing the technology-matching module 145 to compare the type of rights accordingly. Thereafter, step S45 is proceeded.

In step S45, the country of technology data file 164 is established so that a technology demander can store therein countries of technologies, thereby allowing the technology-matching module 14S to compare data of countries accordingly.

In conclusion from the above, the system and method for technology valuation and transaction of the present invention allow a technology supplier to input data of technology for valuation or transaction in a technology supply database and a technology demander to input data of the required technology in a technology demand database, and then a technology-valuation module is executed to conduct technology valuation according to technology related data inputted by the technology supplier, lastly, a technology-matching module is executed to search from the technology supply database and the technology demand data for the complementary data, and also inform both the technology supplier and demander by E-mail of an initial match of technology, thereby facilitating the transaction of technology.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. An on-line technology valuation and transaction system for allowing a user at a terminal device to conduct online technology valuation and transaction through a network unit, the system at least comprising:
   a technology supply database for storing technology supply data;
   a member database for storing member data; and
   a technology valuation and transaction interface for allowing both parties of a technology supplier and a technology demander to input technology data to be appraised and transacted, the interface comprising:
       a safety control module for determining access rights of a user to access the technology supply database and to execute system functions of the on-line technology valuation and transaction system according to the member data stored in the member database, and for displaying a personal web page corresponding to the user according to the access right of the user if the user is determined to be one of the member data stored in the member database;
       a technology data input module operating in cooperation with the safety control module for the user to input the technology data into the technology supply database; and
       a technology-valuation module for conducting online technology valuation according to the technology supply data stored in the technology supply database, wherein the technology-valuation module performs a valuation process according to the technology supply data and an industry category, wherein the valuation process is an Expert Mode process, wherein the Expert Mode process has a valuation formula $$MV = \sum_{i=1}^{N} \frac{UFi}{(1+R)^i} + \sum_{j=N+1}^{M} \frac{UFj}{(1+r)^j},$$

where MV is an abbreviation of Market Value of Industrial technology, UFi represents a first product of a basic quantity, a standard ratio, a utilization ratio and an exploitation ratio, UFj represents a second product of the basic quantity, an extension standard ratio, an extension utilization ratio and an extension exploitation ratio, N represents a technology lifespan, M represents an extension technology lifespan, R represents a net cash flow discount ratio of technology reward during a lifespan, r represents a discount ratio of technology capital, i represents a number of cycles in the lifespan, and j is equal to N added by one, wherein the basic quantity is equal to an overall market potential multiplied by a market share, and the standard ratio is equal to an expected net cash flow of business activity divided by a business income;
   a technology demand database for storing technology demand data; and
   an apparatus for installing the technology valuation and transaction interface managing the technology supply database and the member database, wherein the apparatus is a Web Server for managing the technology supply database, the technology valuation and transaction interface and the member database, the web server able to be connected to the network unit.

2. The technology valuation and transaction system of claim 1, wherein the technology supply data at least comprise one selected from a group consisting of keywords, technology fields, types of rights, and countries of technology origin.

3. The technology valuation and transaction system of claim 2, wherein the technology demand data at least comprise one selected from a group consisting of keywords, technology fields, types of rights, and countries of technology origin.

4. The technology valuation and transaction system of claim 3, wherein the technology-valuation module comprises a technology-matching module for comparing the keywords, the technology fields, the types of rights, and the countries of technology origin stored in the technology supply database and the technology demand database to find matched data.

5. The technology valuation and transaction system of claim 1 further comprising an expert database for storing expert data.

6. The technology valuation and transaction system of claim 5, wherein the expert data at least comprise technology field data.

7. The technology valuation and transaction system of claim 6, wherein the technology-valuation module further recommends technology valuation experts according to the technology supply data and the technology field data of the expert data.

8. The technology valuation and transaction system of claim 1, wherein the technology-valuation module comprises a technology transaction module for generating one selected from a group consisting of a buyer's price ceiling, a buyer's price floor, a seller's price ceiling, and a seller's price floor, thereby providing both parties of the technology supplier and the technology demander with references for negotiating prices online accordingly.

9. The technology valuation and transaction system of claim 8, wherein the seller's price ceiling refers to research and development cost added by direct valuation cost.

10. The technology valuation and transaction system of claim 8, wherein the seller's price floor refers to opportunity cost.

11. The technology valuation and transaction system of claim 8, wherein the seller's price floor refers to direct valuation cost.

12. The technology valuation and transaction system of claim 8, wherein the buyer's price ceiling refers to research and development cost.

13. The technology valuation and transaction system of claim 8, wherein the buyer's price ceiling refers to cost-plus prices of public tender, negotiation and price ratio.

14. The technology valuation and transaction system of claim 8, wherein the buyer's price floor refers to a speculated price floor tolerable by a seller.

15. An on-line technology valuation and transaction method for allowing a user at a terminal device to conduct online technology valuation and transaction, the method at least comprising:
- preparing an apparatus, the apparatus connected to a network unit which is a web server;
- installing a technology valuation and transaction interface in the web server, and installing a browser in the terminal device;
- instructing the user at the terminal device to input technology supply data including an industry category, the browser sending the technology supply data including the industry category to said web server to which the apparatus is connected;
- upon receiving the request for online technology and valuation, the apparatus reading the technology supply data to conduct online valuation;
- the apparatus selecting a valuation process to be performed by the apparatus according to the technology supply data and the industry category, wherein the valuation process is an Expert Mode process, wherein
- the Expert Mode process has a valuation formula $$MV = \sum_{i=1}^{N} \frac{UF_i}{(1+R)^i} + \sum_{j=N+1}^{M} \frac{UF_j}{(1+r)^j},$$

where MV is an abbreviation of Market Value of Industrial technology, UFi represents a first product of a basic quantity, a standard ratio, a utilization ratio and an exploitation ratio, UFj represents a second product of the basic quantity, an extension standard ratio, an extension utilization ratio and an extension exploitation ratio, N represents a technology lifespan, M represents an extension technology lifespan, R represents a net cash flow discount ratio of technology reward during a lifespan, r represents a discount ratio of technology capital, i represents a number of cycles in the lifespan, and j is equal to N added by one, wherein the basic quantity is equal to an overall market potential multiplied by a market share, and the standard ratio is equal to an expected net cash flow of business activity divided by a business income.

16. The technology valuation and transaction method of claim 15, wherein the technology supply data at least comprise one selected from a group consisting of keywords, technology fields, types of rights and countries of technology origin.

17. The technology valuation and transaction method of claim 15 further comprising storing expert data.

18. The technology valuation and transaction method of claim 17, wherein the expert data at least comprise technology field data.

19. The technology valuation and transaction method of claim 15 further comprising searching for expert data having technology field data matched with at least one of the technology supply data.

20. The technology valuation and transaction method of claim 15 further comprising storing technology demand data.

21. The technology valuation and transaction method of claim 20, wherein the technology demand data comprise at least one selected from a group consisting of keywords, technology fields, types of rights, and countries of technology origin.

22. The technology valuation and transaction method of claim 20 further comprising searching the technology supply data and the technology demand data for matched data.

23. The technology valuation and transaction method of claim 20 further comprising generating at least one selected from a group consisting of a buyer's price ceiling, a buyer's price floor, a seller's price ceiling and a seller's price floor.

24. The technology valuation and transaction method of claim 23, wherein the seller's price ceiling refers to research and development cost added by direct valuation cost.

25. The technology valuation and transaction method of claim 23, wherein the seller's price floor refers to opportunity cost.

26. The technology valuation and transaction method of claim 23, wherein the seller's price floor refers to direct valuation cost.

27. The technology valuation and transaction method of claim 23, wherein the buyer's price ceiling refers to research and development cost.

28. The technology valuation and transaction method of claim 23, wherein the buyer's price ceiling refers to cost-plus prices of public tender, negotiations and price ratio.

29. The technology valuation and transaction method of claim 23, wherein the buyer's price floor refers to a speculated price floor tolerable by a seller.

* * * * *